Patented Nov. 5, 1946

2,410,619

UNITED STATES PATENT OFFICE 2,410,619

SULFAMYL BENZOTRIAZOLES

Charles F. H. Allen, Rochester, N. Y., and Alan Bell, Knoxville, Tenn., assignors to Eastman Kodak Company, Rochester, N. Y., a corporation of New Jersey No Drawing. Application April 20, 1944, Serial No. 531,980

3 Claims. (Cl. 260—308)

This invention relates to sulfamyl benzotriazoles, including sulfamyl benzazimidoles.

Sulfamyl derivatives of benzotriazole and of benzazimidole (1-hydroxy-benzotriazole) have not been reported in the literature. We have prepared such compounds, examples of which we describe below, together with methods for their preparation and for the preparation of their intermediate compounds.

*Example 1.*—Preparation of intermediate compound, 3,4-diaminobenzene sulfonamide,

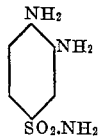

A mixture of 5 parts of 3-nitro-4-amino-benzenesulfonamide, 25 parts of alcohol, 15 parts of sodium hydrosulfite, and 50 parts of water was heated on the steam bath for 2 hours, and evaporated to dryness. The residue was extracted with alcohol, filtered, and the product from the extract finally crystallized from water. The yield was 2 parts, M. P. 174–175° C. (Analysis: Calcd. for $C_6H_9O_2N_3S$: N, 22.46; found: N, 22.59.) 3,4-diaminobenzenesulfonamide can also be obtained in a yield of 80% by reducing an alcoholic solution of the nitro compound by hydrogen in the presence of Raney nickel.

*Example 2.*—5-sulfamyl benzotriazole,

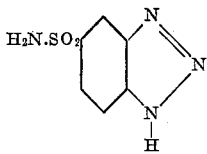

A solution is prepared by warming together 2 parts of 3,4-diaminobenzenesulfonamide, 20 parts of water 1.3 parts of glacial acetic acid, and 0.2 part of concentrated hydrochloric acid (sp. gr. 1.19). The solution is then cooled to 10–15° C., and 1 part of sodium nitrite in 5 parts of water is added all at once. The solution becomes first green, then red, and finally straw yellow. The solid that separates on cooling is filtered, treated with decolorizing charcoal, and left to crystallize. There is thus obtained 1.5 parts of the triazole, M. P. 236–237° C.

*Example 3.*—Preparation of intermediate compound, N-β-hydroxyethyl-3-nitro-4-chlorobenzenesulfonamide,

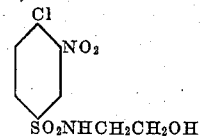

To a boiling solution of 10 parts of 3-nitro-4-chlorobenzene sulfonyl chloride in 100 parts of benzene, 5 parts of ethanolamine was added; an oil separated. After adding enough alcohol to dissolve this oil, the clear solution was concentrated to a small volume, and water added. When the last traces of benzene had been removed, a solid that separated was taken up in boiling water and allowed to crystallize. The yield of crude product was 9.2 parts. The pure substance melts at 125° C. (Analysis: Calcd. for $C_8H_9O_5N_2SCl$:

N, 9.98; found: N, 10.21.)

*Example 4.*—6-N-β-hydroxyethylsulfamyl benzazimidole,

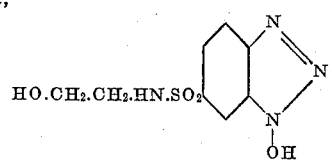

A mixture of 5 parts each of N-β-hydroxyethyl-3-nitro-4-chlorobenzenesulfonamide and 85% hydrazine hydrate, and 35 parts of absolute alcohol was refluxed for 2 hours. After addition of water and removal of alcohol, a low yield of solid M. P. 168–169° C., with decomposition, was obtained. This substance decomposes violently when heated in a free flame. (Analysis: Calcd. for $C_3H_{10}O_4N_4S$: N, 21.70; found: N, 21.86.)

*Example 5.*—6-sulfamyl benzazimidole,

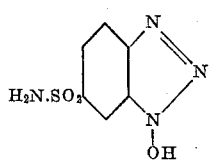

A mixture of 4.5 parts of 3-nitro-4-chloro-benzenesulfonamide, 10 parts of 85% hydrazine hydrate, and 12 parts of alcohol was refluxed for 2 hours. The product that crystallized on cooling was filtered and dissolved in water, and the solution was acidified with hydrochloric acid. The yield was 1.8 parts, M. P. 222° C. with decomposition. (Analysis: Calcd. for $C_6H_6O_3N_4S$: N, 26.17; found: N, 26.21.)

*Example 6.*—Preparation of intermediate compound, N-(2'-hydroxyphenyl)-3-nitro-4-chlorobenzenesulfonamide,

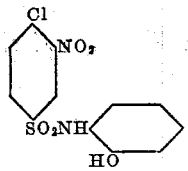

A mixture of 15.4 parts of o-aminophenol, 37.5 parts of 3-nitro-4-chlorobenzenesulfonyl chloride, 15 parts of sodium acetate and 75 parts of acetic acid was heated on the steam bath for ½ hour. The solid that separated on cooling was filtered off, washed and dried. For purification, it was taken up in ether and extracted successively with 3% hydrochloric acid, water, and 3% aqueous sodium carbonate solution. After drying the extract with calcium chloride, the ether was removed and the residue crystallized from benzene. The yield was 16 parts, M. P. 143–145° C. (Analysis: Calcd. for $C_{12}H_9O_5N_2SCl$: N, 8.53; found: N, 8.43.)

*Example 7.*—2'-hydroxy-6-phenylsulfamyl benzazimidole,

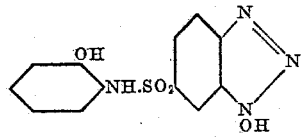

A mixture of 11.5 parts of N-2'-hydroxyphenyl-3-nitro-4-chlorobenzene-sulfonamide, 22 parts of 85% hydrazine hydrate and 100 parts of alcohol was refluxed for 3 hours, and evaporated to a small volume under reduced pressure. The residual mixture was diluted with water and acidified with hydrochloric acid. After several hours the product was filtered. M. P. 228° C., with decomposition. (Analysis: Calcd. for $C_{12}H_{10}O_4N_4S$: N, 18.30; found: N, 18.09.)

While we have given certain illustrative examples, it will be obvious that other substituents than those shown may be present on the nitrogen atom of the sulfamyl group. In the claims, we mean the term "sulfamyl" to include N-substituted sulfamyl groups.

What we claim as our invention and desire to be secured by Letters Patent of the United States is:

1. A compound having the structural formula

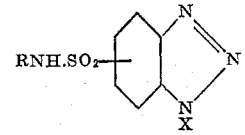

in which R represents a member selected from the class consisting of H, hydrocarbon groups, and hydroxy-substituted hydrocarbon groups, and X represents a member selected from the group consisting of H and OH.

2. A C-sulfamyl benzotriazole.
3. A C-sulfamyl benzazimidole.

CHARLES F. H. ALLEN.
ALAN BELL.